April 2, 1963   W. C. BROWN   3,083,528
MICROWAVE ENGINES

Filed May 12, 1959   2 Sheets-Sheet 1

INVENTOR
WILLIAM C. BROWN
BY H. Vincent Harsha
ATTORNEY

April 2, 1963  W. C. BROWN  3,083,528
MICROWAVE ENGINES
Filed May 12, 1959  2 Sheets-Sheet 2

INVENTOR
WILLIAM C. BROWN
BY H. Vincent Harsha
ATTORNEY

United States Patent Office 3,083,528
Patented Apr. 2, 1963

3,083,528
MICROWAVE ENGINES
William C. Brown, Weston, Mass., assignor to Raytheon Company, Lexington, Mass., a corporation of Delaware
Filed May 12, 1959, Ser. No. 812,697
3 Claims. (Cl. 60—35.5)

This invention pertains generally to engines, and more particularly to engines adapted to be energized by means of microwave energy. The term "engine" is employed in the broad sense herein, and is intended to refer to any machine or apparatus by means of which physical power is applied to produce a physical effect, as, for example, in the utilization of radiant energy to produce a physical force. While the description that follows is directed primarily to jet engines for aircraft, space vehicles and the like, it will be understood that the jet engine is merely exemplary of the several forms which the apparatus of the present invention may take.

In general, there are two broad types of jet engines. One of these provides a propulsive jet consisting of highly heated, compressed atmospheric air usually admixed with the products of the combustion produced by the burning of a fuel in the air, with the thermal energy of the fuel being employed to raise the air temperature to the desired value. This type of jet engine is usually referred to as an air-breathing or thermal jet engine. In the other type of engine there is also a propulsive jet formed by generating large quantities of high-pressure, high-temperature gases, but this latter type of jet is the result of a chemical reaction which does not utilize atmospheric air, with both the fuel and an oxidizer therefor being carried as propellants in tanks or the like associated with the engine. This latter type of engine is the rocket engine.

As is well known, the air-breathing jet engines are generally classified as either ramjet, turbojet (closed or open cycle) or pulse jet. The first of these three types is the simplest, since it needs few, if any, moving parts. The simple ramjet depends upon motion through the atmosphere to force air through the inlet and into the diffuser section where the air is compressed preparatory to its combination with a suitable fuel in the combustion chamber. The hot gases produced by the combustion then flow through a suitable exhaust nozzle where they are expanded and finally discharged into the surrounding atmosphere to provide the desired propulsive thrust. The open-cycle turbojet engine differs from the ramjet in that the exhaust gases drive a turbine which, in turn, drives an air compressor for compressing the air introduced into the combustion chamber, and as a result the turbojet does not primarily rely on velocity relative to the surrounding atmosphere in order to achieve operation. In the closed-cycle turbojet engine a suitable gas in confined in a closed circuit including a compressor, a heat exchanger and a turbine, and shaft power from the turbine drives both the ingine compressor and a propulsion compressor (or a suitable propeller means in non-jet vehicles) communicating with the atmospheric air. The pulse jet differs from the ramjet in the main in the fact that the pulse jet is characterized by intermittent firing as opposed to the continuous firing of the ramjet.

With respect to rocket engines, there are two basic types, viz., those employing liquid propellants and those employing solid propellants.

As is evident, one or another of the aforementioned jet engines may be modified in such manner that the exhaust jet therefrom actuates a turbine having a rotary shaft output, instead of directly serving as a reaction stream propulsion means. With such a rotary shaft output from the engine, propulsion may be effected by means of a propeller or the like attached to the rotary output shaft.

Irrespective of the particular one of the several aforementioned types of engines that one may choose to employ, in each such choice one must be prepared to supply a sufficient amount of fuel to be carried along with the engine in the craft which it is to propel, so that propulsive energy may be exerted throughout the intended power portion of the flight span of such craft. In the case of the air-breathing engines, all that need be supplied as an appropriate fuel for burning in the atmospheric air that is taken into the engine for the combustion process, while the rocket engines require the carrying of both a fuel and an oxidizer therefor. It is evident that these requirements place a limitation upon the operation and effectiveness of any craft which is to be propelled by such engines, whether for military or other purposes, since not only is the maximum time of continuous operation thereof limited by the amount of fuel or other propellants carried on board the craft, but the very fact that such fuel must be carried is effective in limiting the maximum range and operation time of such craft in view of the additional weight factor imposed by the presence of such fuels. In addition, a reduction of fuel weight would also permit a greater payload for a given total weight of the vehicle.

The utility of an aircraft, space vehicle or the like which is capable of sustained flight over an indefinitely long period of time without employing a local fuel supply is evident, the applications therefor are numerous. For example, a vehicle capable of perpetual operation (except for mechanical failure) and stationed in space above the surface of the earth, either within or without the atmosphere thereof, may perform alarm and surveillance tasks by radar techniques, along with guidance and protection of defense vehicles, and may simultaneously provide long-haul broadband communications. Systems of such vehicles or platforms may be established to provide radar and communication networks.

These desired operational characteristics are provided by a vehicle driven by the engine of the present invention, which engine is energized by means of transmitted microwave electromagnetic energy that is beamed toward the vehicle. The engine converts the microwave energy incident upon the vehicle into appropriate mechanical forces which produce the desired flight operation of the vehicle. The advantages attendant the utilization of microwave energy, in contrast to electromagnetic energy of other wavelengths, are readily apparent. Microwaves have been generally defined as radio waves whose wavelength is less than 30 centimeters, with a lower wavelength limit on the order of one millimeter or one centimeter sometimes being applied to what is called "the microwave region." The superiority of microwaves is due in part to the fact that it is generally necessary to focus the transmitted energy so as to achieve a desirably high power density at a remote point or area with respect to a given generator or transmitter power level. In accordance with the laws of optics, the sharpness of the beam produced by an antenna varies as the ratio of antenna dimensions to the wavelength of the transmitted energy. Thus, for a given or desired power density or beam sharpness, a decrease in wavelength of the transmitted energy permits a corresponding decrease in the dimensions of the antenna. From the standpoint of mechanical convenience, it is generally desirable to employ small antennas and other components, and it is therefore advantageous to employ energy of very short wavelength. In addition, the difficulties encountered in relatively long wave transmission as a result of natural and man-made interference or noise (which noise would interfere with the transmission of radar or communications intelligence via the microwave power beam) do not occur with any appreciable significance at microwave frequencies. Also, where the space vehicle is to be operated at an altitude above the ionosphere, long wave transmission will generally be reflected by the reflecting layers thereof, while microwaves pass through such layers substantially unaffected.

In view of the several advantages stated above, it might appear desirable to employ the shortest wavelength possible commensurate with the power-generating capabilities of the transmitter at the wavelength chosen. A lower limit is fixed, however, for the wavelength that may be used in a practical radiating system in view of the increasing losses due to absorption occurring in the atmosphere at wavelengths below five to ten centimeters. In the one to two centimeter region there is a peak in absorption by water vapor, and even for dry air the absorption of electromagnetic energy increases very rapidly below one or two centimeters. It may thus be seen that microwaves in a region having the approximate bounds of two and thirty centimeters are readily adaptable to convenient radiation of energy to a remote point with small transmission loss, with the preferred wavelengths being of the order of five or ten centimeters in order to accomplish efficient focusing with a transmitting lens system of reasonable size without inflicting an intolerable power loss by absorption.

The key to the practical utilization of high-power electromagnetic beams for remote energization of the propulsion engine in aircraft, space vehicles and the like is a device which will generate large amounts of power within this wavelength region. In addition, many applications of such high-power beams require such refinements as broad electronic bandwidth and low phase distortion, placing the additional requirement of sophisticated performance on the high-power generator. A device which currently satisfies the dual requirements of high power output and refined performance is the Amplitron tube, a relatively new type of crossed-field vacuum tube which may be used as a compact, highly efficient, broadband amplifier capable of handling high peak and average powers, and which generally comprises a circular but non-reentrant, dispersive network matched at both ends over the frequency region of interest, and a reentrant electron beam originating from a continuously-coated (or nearly so) cathode coaxial with the network, with a D.C. potential being applied between the cathode and anode, and a magnetic field applied parallel to the axis of the cathode and transverse to the electric field between the anode and the cathode. For a more complete description of the Amplitron, reference may be had to my United States Letter Patent 2,933,723, issued April 19, 1960 for "Low Level Duplexer System." Amplitrons currently available are capable of producing 15 or 20 kilowatts of average radio-frequency power in the neighborhood of ten centimeters in wavelength, and future models are expected to yield 500 kilowatts or more average power, wtih 50 megawatt peak power.

Accordingly, it is a primary object of the present invention to provide an engine for propelling aircraft, space vehicles and the like in response to incident microwave electromagnetic energy.

A concomitant object of the invention is to provide a heat exchanger adapted to be energized by incident microwave energy.

An ancillary object of the invention is to provide an engine capable of producing a sustained propulsive thrust for an aircraft or the like without necessitating the carrying of a supply of fuel for energization of such engine.

A further object of the invention is to provide an engine for aircraft and the like which are adapted to be operated by means of remotely generated microwave energy.

Another object of the invention is to provide an air-breathing jet engine for a vehicle wherein the vehicle may be propelled by such engine for an indefinitely long time period without the transportation of fuel or other propellant by such craft.

Yet another object of the invention is to provide a jet engine of the rocket type for a vehicle wherein the vehicle need carry only a single light-weight propellant medium, with the energy for heating such propellant being in the form of remotely generated radiant energy.

In accordance with an exemplary form of the apparatus of the present invention, these and other objects are achieved by means of a jet engine including a heat exchanging container means adapted to be energized by microwave energy to heat a gaseous medium therein and cause expansion of same to produce a jet stream for providing a propulsive thrust. In one preferred form of the invention, the container means comprises an electromagnetic waveguide of lossy characteristics which produces heat upon energization by suitable electromagnetic energy to raise the temperature of a gaseous medium passing therethrough. A member of stacked and closely-spaced electrically lossy plates is preferably mounted within the waveguide to serve as the main means for absorbing microwave energy and converting same into heat. The plurality of closely spaced plates form therebetween a series of narrow passages through which passes the gaseous medium which is to be heated thereby. The microwave energy employed is of sufficiently high frequency to produce a pronounced skin effect in the waveguide and associated heat-exchanger, so that the energy expended in creating heat in the steady state condition is effectively and quickly transferred to the gaseous medium in which the particular conductor exhibiting the skin effect is immersed. This latter feature is particularly advantageous in transient state conditions with respect to the ability of the engine of this invention to provide almost instantaneous response to a change in the level of the applied microwave energy, since little or no time lag is involved in converting electromagnetic energy to heat and transferring it to the cooling gas.

As applied to the configurations of any of the aforementioned types of jet engines, the waveguide energy absorber and heat exchanger of the present invention will generally take the place of the combustion chamber. For example, in the air-breathing types of jet engines the compressed air will pass around and through the waveguide heat source and will subsequently be expanded in a suitable nozzle to provide the desired thrust. In the rocket type engine, a suitable gaseous propellant of low molecular weight (in order to achieve greater specific impulse) will pass over and through the heat source to be expanded and forced through a suitable nozzle to provide a reaction stream.

With the above considerations and objects in mind, the invention will now be described in connection with a preferred embodiment thereof given by way of example and not of limitation, and with reference to the accompanying drawings, in which.

Figure 1:
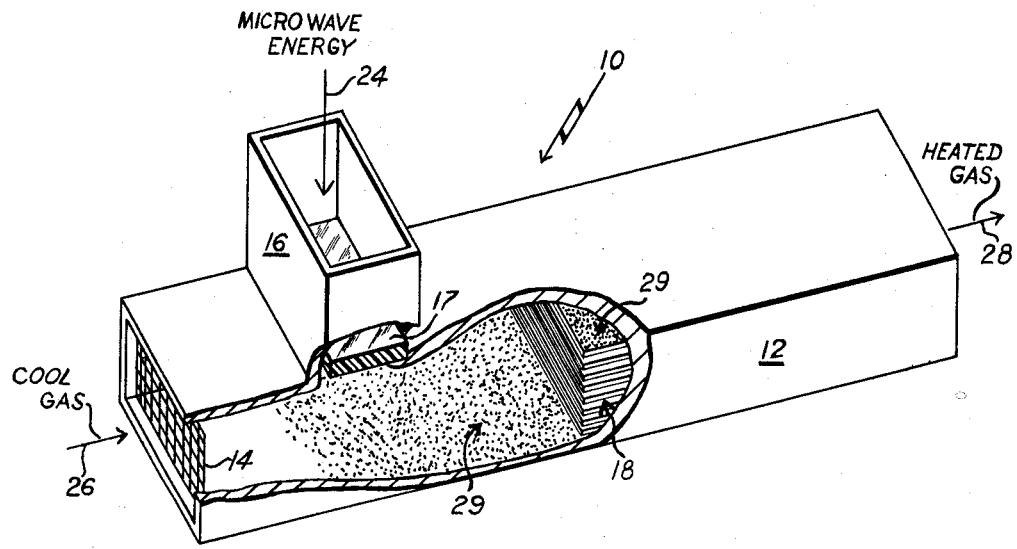
FIG. 1 is a perspective view, partly broken away, of a preferred form of the basic elements of the engine of the present invention.

Referring now to FIG. 1, the reference numeral 10 therein indicates in a general manner the waveguide type heat source of the present invention. As may be seen, the waveguide 10 comprises a main hollow member 12 of rectangular cross-section, having a suitable screen 14 near one end thereof through which a suitable gaseous medium is passed, as indicated by the arrow 26. The screen 14 serves to define one terminus of the chamber in which the heating action is effected, and it will be understood that a similar screen (not shown) may be positioned across the main waveguide portion at the opposite end thereof to cooperate with other elements within the waveguide in defining the opposite terminus. A particular advantage derived from the use of such a second screen is the suppression of radio-frequency energy emission from such opposite end. These screens are of such construction as to provide an effective wall for the electromagnetic energy that is employed in energizing the apparatus of this invention, yet they are sufficiently foraminous to allow a desirable free flow of air or other gaseous medium through the waveguide from left to right as shown in FIG. 1.

Microwave energy of a suitably high amplitude may be collected by a suitable antenna or the like and then introduced into the waveguide 10 through a branch 16 (which includes means such as the microwave window 17 for preventing upward flow of the gas in branch 16 while passing the microwave energy downwardly therethrough), and a stack of electrically conductive plate-like members indicated generally at 18 is mounted by suitable means (not shown) within the main body of the waveguide. Alternatively, the incident R.-F. energy may fall directly upon the heat exchanger stack 18 without being collected by an antenna or the like. The stack 18 of conductive plates comprises a plurality of such plates in closely spaced-apart relationship, so as to provide therebetween a plurality of narrow passages through which the gaseous medium flows toward the right in FIG. 1. This construction is such as to provide a heat-transfer surface of large area in the plate stack 18 for a given amount of microwave energy introduced into the branch 16 of the structure.

Figure 2:
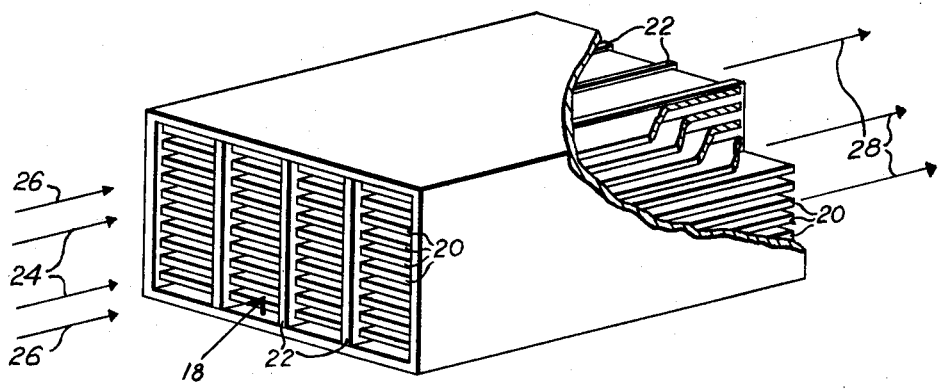
FIG. 2 is a perspective view, partly broken away, of an exemplary form of the heat exchanging member which is utilized in the preferred form of the apparatus of the invention.

FIG. 2 shows in greater detail the structure of a preferred form of the plate stack 18, with the several plates 20 thereof being shown supported in horizontal position by several vertical support plates 22. Arrows 24 represent the incoming microwave energy applied to the stack 18, which energy may be transmitted via a waveguide as shown in FIG. 1, or which may constitute a radiated beam of microwave energy directed at the stack, and arrows 26 represent the cool gaseous propellant medium as it enters the stack to be heated, with the heated exhaust stream being indicated by the arrows 28. The plates 22 are preferably a metal of a high specific resistance, such as materials sold under the trade names of Inconel and Nichrome, or may be fabricated from a suitable ceramic-metal mixture. Alternatively or additionally, the structural members (the plates 22 and the walls of the waveguide and heat exchanger as well) may be provided with an anechoic coating of a material of high specific resistance (such as that sold under the trade name of Kanthol), as indicated at 29 in FIG. 1.

In the operation o fthe apparatus shown in FIGS. 1 and 2, microwave energy is transmitted down the waveguide branch 16 and into the main body portion 12 of the waveguide member. This chamber is preferably several wavelengths long at the frequency of the applied microwave energy, and the chamber itself may be resonant at such frequency in order to enhance the operation thereof for lower power applications. This application of microwave energy to the chamber within the waveguide member 12 results in the absorption of energy by the plate stack 18 and the walls of the waveguide, with the energy so absorbed being converted into heat. Thus, the surfaces of the several members against which flows the gaseous medium passing through the waveguide from left-to-right in FIGS. 1 and 2 (as indicated by the arrows therein) will be heated, with the heat therein being transferred to the surrounding gaseous medium. With the application of a sufficient level of microwave energy, the gaseous medium flowing through the waveguide will be heated to a sufficient extent to cause an expansion of the gaseous medium in the manner of the exhaust from the combustion chamber of the jet engines of the prior art.

As will be appreciated by those skilled in the art, microwave energy is sufficiently high in frequency to produce a pronounced skin effect, and the electrical current flowing in the conductive material of the waveguide or plate stack therein is confined to a very shallow penetration from the surface of such material. With the current flowing only on or very near to the surface of these members, the heat produced therein by such current flow will be generally confined to such surfaces or to such shallow penetration. Such operation results in the rather apparent advantage that the heat is produced at the surfaces of the conducting members, and this is where the gaseous medium to be heated is in contact with such members. In other words, the heat is produced at the very areas where it is desired. However, there is also a more subtle advantage to be gained by this operation, viz., the fact that the heat is generated in a very small volume or mass of the lossy material, thus dramatically reducing the size and weight in comparison to the heat exchangers of the prior art, and in addition, when it is desired to change the rate of application of the heat to the gaseous medium (as by changing the level of the applied microwave energy) there is little or no time-lag in adjusting to the new level of operation, since heat transfer is inversely proportional to the distance between the source (the surface exhibiting skin effect) and the sink (the gaseous medium), and such distance is so small in this structure. In comparison with the structures of the prior art, this engine may be constructed with thinner materials or with hollow members so as to provide a reduction in the weight.

Figure 3:
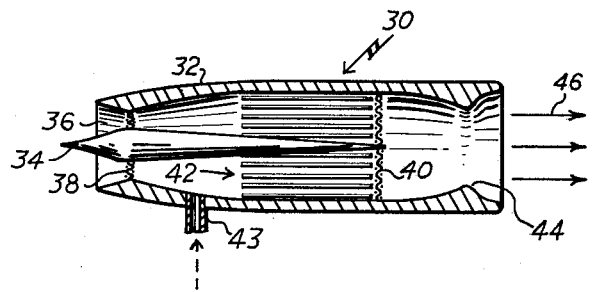
FIG. 3 is a schematic representation, in vertical section, of a ramjet engine constructed in accordance with the present invention.

FIG. 3 shows a ramjet engine constructed in accordance with the present invention, indicated generally at 30. This engine comprises a substantially cylindrical outer member or housing 32, with a central member 34 mounted therein in coaxial arrangement therewith. The opening 36 in member 32 includes the inlet opening for atmospheric air to enter the engine upon relative motion of the engine and the surrounding atmosphere, as well as the usual diffuser to decrease the velocity of the air so admitted to increase the pressure thereof.

A pair of foraminous screens 38 and 40 are employed to define the electromagnetic chamber but to permit the free passage of the compressed or heated air therethrough. Between such screens is mounted the "stack" 42 of heat exchanging plates, corresponding to the plate stack 18 of the earlier figures of the drawings, and it will be understood that this assembly 42 may include a plurality of flat plates as shown in connection with FIGS. 1 and 2, or it may equally well include a plurality of nested cylindrical or other-shaped metallic members spaced in such manner as to provide a plurality of narrow or thin passages therebetween through which the gaseous propellant is to pass. A suitable waveguide or transmission line branch 43 is provided in communication with the interior of member 32 for introducing radio-frequency electromagnetic energy therein.

To the right (in FIG. 3) of the screen 40 is a suitable exhaust nozzle 44, such as the converging-diverging or De Laval nozzle, from which the heated propellant gas or air is expelled and expanded into the surrounding atmosphere to provide a jet stream affording a propulsive thrust on the engine 30, such stream being indicated by the arrows 46.

The operation of the ramjet engine of FIG. 3 is at once evident. Upon relative motion of sufficient degree beteween the engine 30 and the surrounding atmosphere, the air entering the inlet-diffuser 36 is compressed and then passed into the central part of the chamber defined by the two foraminous screens 38 and 40, where it passes around and between the several plates or other members of the heat-exchanging assembly 42. The application of microwave electromagnetic energy by means of the branch line 43 results in the absorption of such energy by the assembly 42, with heat being produced therein and being transmitted to the air passing therethrough. The air is thus heated to a temperature much greater than the entering temperature, and the hot air expands upon being expelled from the exhaust nozzle 44 and leaves the engine with a relatively greater velocity than that of entry, producing a thrust thereby.

Figure 4:
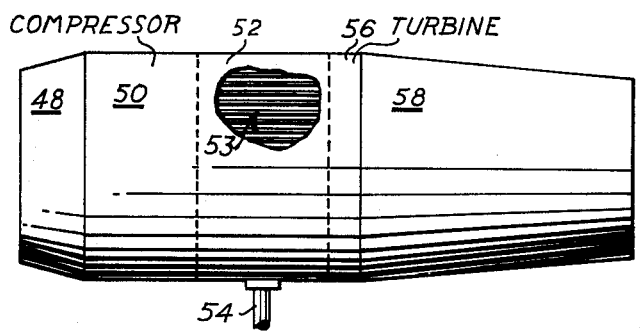
FIG. 4 is a side elevation schematic representation of a turbojet engine in accordance with the present invention.

The construction of a turbojet engine in accordance with the invention is quite similar to that of the ramjet engine of FIG. 3, and is shown schematically in FIG. 4. In the latter figure, the numeral 48 indicates the input or inlet section, next to which is a compressor 50. Following the compressor 50 is the heat-exchanging section 52, which includes a waveguide branch 54 for the introduction of microwave energy into the interior of the heat-exchanging section 52. This latter section also includes a suitable heat-exchanging stack or assembly 53 similar to those described in connection with the preceding figures of the drawings. Just downstream from the heat-exchanging section 52 is a turbine section 56 having a turbine therein operated by the heated gases coming from the heat-exchanging section 52. The turbine serves as the source of power for operating the compressor in the forward section 50. Following the turbine section 56 is the exhaust nozzle 58, which may take any suitable form for directing the heated gaseous medium (the atmospheric air taken into the forward inlet of the engine) into the atmosphere to provide a propulsive thrust on the engine.

The operation of the turbojet engine of FIG. 4 is immediately evident upon comparison with that of the ramjet engine of FIG. 3. In the turbojet engine of FIG. 4, air entering the inlet section 48 is directed into the compressor 50, where it is compressed before being passed to the heater section 52. The application of microwave energy through branch guide 54 into the interior of the heater section 52 causes the absorbing surfaces therein to absorb such energy and produce heat which is passed to the gaseous medium passing therethrough. The application of this heat to the propellant medium causes the latter to expand out through the nozzle 58 to apply the desired thrust to the engine.

Figure 5:
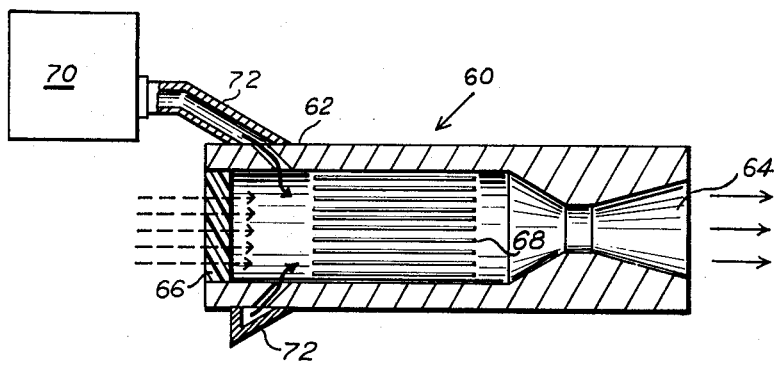
FIG. 5 is a schematic representation, in partial vertical section, of a rocket engine in accordance with the present invention.

FIG. 5 shows a rocket engine in accordance with the present invention indicated generally at 60 and comprising a substantially cylindrical housing 62 having an exhaust nozzle 64 associated therewith. The end of the housing 62 remote from that of nozzle 64 includes a "window" 66 for electromagnetic energy, such window providing a means for introducing microwave energy into the interior of the housing 62 while maintaining such housing a closed container except at the nozzle end, whereby heated gases within the housing are directed toward the exhaust nozzle. It will be understood, of course, that the microwave energy may equally well be fed to the interior of housing 62 through the nozzle 64 by means of a suitable funnel or other collector. The microwave energy so introduced into the interior of the housing is absorbed by the heat-exchanging assembly 68, which may be constructed as described in connection with the preceding figures of the drawings. In order to produce a propulsive thrust at the nozzle 64, a suitable gaseous propellant medium is supplied to the interior of the housing 62 from a tank or other reservoir 70 by means of a conduit and manifold 72, the latter preferably including a suitable control valve (not shown). The operation is apparent, with the gaseous propellant being fed into the housing 62 by means of the conduit 72, and microwave energy being applied thereto by means of the permeable window 66 to heat the heat-exchanging assembly, and the heat so produced is transferred to the gaseous propellant medium to be expelled through the exhaust nozzle 64.

The invention has been described above in considerable detail, and particularly with reference to its application to engines for producing a thrust by means of a jet stream. However, it will be apparent to those skilled in the art that the invention is broadly applicable to other engines, including those providing a rotary shaft output, as by feeding the described jet stream output through a turbine, with the shaft of the latter providing the motive power of the output. Further, as applied to rocket engines, the inventive concept of the present invention is not limited to the use of liquid propellants as described herein, but may be employed with suitable structures for heating a solid propellant in such an engine. Additionally, while the heat-exchanging means is disclosed herein as an assembly of closely-spaced conducting plates or the like, it will be understood that where sufficient microwave power is available, the absorbing and heat-exchanging surfaces may comprise the inner surfaces of a hollow waveguide only, with no additional heat exchanger being necessary. Hence, the invention is not to be considered as being limited to the particular details given, nor to the specific application to which reference has been made during the description of the apparatus, except insofar as may be required by the scope of the appended claims.

What is claimed is:

1. In a reaction engine including a fluid inlet and a nozzle through which fluid is expelled producing thrust, means between said inlet and nozzle for heating said fluid comprising an elongated chamber having walls of electrically conductive material, one end of said chamber being connected to said inlet and the other end of said chamber being connected to said nozzle, means in said chamber for absorbing microwave energy without substantially blocking the flow of fluid therethrough, means substantially transparent to microwave energy forming part of the walls of said chamber between said inlet and said absorbing means, and means between said inlet and said transparent means for reflecting microwave energy without substantially blocking the flow of said fluid therethrough.

2. A reaction engine as in claim 1, and said microwave energy absorbing means including a plurality of resistive vanes arranged parallel to each other and parallel to the longitudinal axis of said chamber.

3. A reaction engine as in claim 1, and said means for reflecting microwave energy including a screen of electrically conductive material disposed in a plane substantially perpendicular to the axis of said chamber.

References Cited in the file of this patent

UNITED STATES PATENTS

| | | |
|---|---|---|
| 1,700,675 | Goddard | Jan. 29, 1929 |
| 2,453,645 | Tiley | Nov. 9, 1948 |
| 2,483,768 | Hershberger | Oct. 4, 1949 |
| 2,875,418 | Rolfs | Feb. 24, 1959 |

OTHER REFERENCES

"Atomic-Powered Plane," SAE Journal, January 1949, pages 44–47.